US 9,280,279 B2

(12) United States Patent
Atkins et al.

(10) Patent No.: US 9,280,279 B2
(45) Date of Patent: Mar. 8, 2016

(54) USER-DEFINED GESTURE ENABLEMENT PROTOCOLS FOR TOUCH INPUT DEVICES

(75) Inventors: Graham Ray Atkins, Kaleen (AU); Ian Andrew Maxwell, Five Dock (AU)

(73) Assignee: ZETTA RESEARCH AND DEVELOPMENT LLC—RPO SERIES, Wilmington, DE (US)

( * ) Notice: Subject to any disclaimer, the term of this patent is extended or adjusted under 35 U.S.C. 154(b) by 0 days.

(21) Appl. No.: 13/473,961

(22) Filed: May 17, 2012

(65) Prior Publication Data

US 2012/0233690 A1 Sep. 13, 2012

Related U.S. Application Data

(63) Continuation of application No. 12/118,047, filed on May 9, 2008, now abandoned.

(30) Foreign Application Priority Data

May 11, 2007 (AU) .................................. 2007902517
May 11, 2007 (AU) .................................. 2007902519

(51) Int. Cl.
*G06F 3/0488* (2013.01)
(52) U.S. Cl.
CPC .................................. *G06F 3/04883* (2013.01)
(58) Field of Classification Search
USPC ............ 345/173–178; 382/115–127; 715/863
See application file for complete search history.

(56) References Cited

U.S. PATENT DOCUMENTS

| 6,163,616 | A * | 12/2000 | Feldman | G06F 3/0395 382/115 |
| 8,311,530 | B2 * | 11/2012 | Kornilovsky | G06F 3/0362 345/173 |
| 2004/0155870 | A1 * | 8/2004 | Middleton | G04G 21/08 345/173 |
| 2005/0122315 | A1 * | 6/2005 | Chalk | G06F 1/1626 345/173 |
| 2005/0210417 | A1 * | 9/2005 | Marvit | G06F 1/1613 715/863 |
| 2007/0262964 | A1 * | 11/2007 | Zotov | G06F 3/0416 345/173 |
| 2008/0012835 | A1 * | 1/2008 | Rimon | G06F 3/038 345/173 |
| 2008/0094370 | A1 * | 4/2008 | Ording | G06F 3/04883 345/173 |
| 2008/0168403 | A1 * | 7/2008 | Westerman | G06F 3/04883 715/863 |
| 2008/0204428 | A1 * | 8/2008 | Pierce | G06F 3/0202 345/174 |

\* cited by examiner

*Primary Examiner* — Ryan A Lubit
(74) *Attorney, Agent, or Firm* — Mattingly & Malur, PC

(57) ABSTRACT

A user interface method is disclosed. For a particular interface, such as a touch input device, the method involves defining an enablement protocol for a function and recording and retaining the enablement protocol of said function, such that a user enables the function by substantially reproducing the enablement protocol in the absence of spatial or temporal indication of at least a portion of the enablement protocol.

12 Claims, 7 Drawing Sheets

USER-DEFINED GESTURE ENABLEMENT PROTOCOLS FOR TOUCH INPUT DEVICES

CROSS-REFERENCE TO RELATED APPLICATIONS

This application is a continuation of U.S. patent application Ser. No. 12/118,047 filed on May 9, 2008, which claims priority under the Paris Convention to Australian Provisional Patent Application No. 2007902519 filed on May 11, 2007 and Australian Provisional Patent Application No. 2007902517 filed on May 11, 2007, the contents of both of which are incorporated herein by reference.

FIELD OF THE DISCLOSURE

The present disclosure relates to user-defined enablement protocols for electronic devices. The disclosure has been developed primarily for providing an enhanced security means for enabling or executing functions of electronic devices through an interface such as a touch-sensitive display, and will be described hereinafter with reference to this application. However it will be appreciated that the disclosure is not limited to this particular field of use.

BACKGROUND OF THE DISCLOSURE

Any discussion of the prior art throughout the specification should in no way be considered as an admission that such prior art is widely known or forms part of the common general knowledge in the field.

Electronic devices often require some form of enablement protocol to activate them or to enable a particular function. For example to activate a mobile phone or to log on to a computer system a user may need to enter an alphanumeric code e.g. '123'. A known drawback here is that if an unauthorised person learns the alphanumeric code, it is simple for them to activate the mobile phone or log in to the computer system. If the device is equipped with a touch screen so that the alphanumeric keys can be shown on a display, an additional level of security is available in that the locations of the keys can be scrambled either before or during entry of the code, making it more difficult for another person to learn the code by observation. However once the code is known, it is once again simple for an unauthorised person to enter it. US Patent Publication No. 2008/00823015 discloses a non-alphanumeric method for unlocking an electronic device whereby direction keys are used to traverse a path through a displayed maze, and the device is unlocked if the path matches a path preset by the user. Once again, there is no security once the unlock code (i.e. the path) is known, and the restriction to using direction keys limits the range and complexity of possible enablement protocols.

Compared with a keyboard with hard keys, touch screens offer a much greater range of enablement protocols for an electronic device. Apart from the well-known 'touch to select' operation mode where a user selects or enables a function by touching a displayed icon, a user can also provide 'gestural input' in the form of one or more swipes or taps for example. US Patent Publication No. 2007/0150842 for instance discloses a method for unlocking an electronic device whereby a person touches a displayed image and moves it along an indicated path. Besides unlocking a device, many other functions can be enabled with gestures on a touch screen. US Patent Publication No. 2006/0026535 for instance discloses various mechanisms for interacting with one or more GUI (Graphical User Interface) elements based on a user interface mode and in response to one or more detected touches. The graphical elements that may be activated include a virtual scroll wheel, a virtual keyboard, a toolbar and a control panel. Functions applied include rotating, translating or re-sizing a displayed image, and scrolling through a list. U.S. Pat. Nos. 5,825,352 and 5,943,043 disclose various two finger gestural inputs that emulate mouse functions, while US Patent Publication No. 2007/0177803 discloses the possibility of allowing a user to assign an arbitrary function to a predetermined gesture. However in all these cases the user is either guided by displayed material or the gesture is predetermined, so there is limited opportunity for altering the functionality provided by the device or the mechanisms by which those functions are enabled.

The present disclosure overcomes or ameliorates at least one of the disadvantages of the prior art, and provides a useful alternative.

SUMMARY OF THE DISCLOSURE

In a first broad aspect, the present disclosure provides a user interface method, comprising the steps of:
i. defining an enablement protocol for a function; and
ii. recording and retaining said enablement protocol of said function, such that a user enables said function by substantially reproducing said enablement protocol in the absence of spatial or temporal indication of at least a portion of said enablement protocol.

In one embodiment, defining the enablement protocol for a function comprises user-engagement with an interface, which comprises rises one or more touches or near touches of a touch screen. However, it will be appreciated that a user may also define an enablement protocol by engaging other types or configurations of interfaces, for example a rectangular frame surrounding a space wherein adjacent borders of the frame include optical emitters and the opposing borders include photo-detectors, i.e. essentially a touch-sensitive screen apparatus minus the actual touch surface. Alternatively, or additionally, the enablement protocol may comprise voice recognition of pre-defined commands (audible instructions), or the tracking of eye movements, or some other type of gesture of one or more parts of the human body. Whatever form a user's enablement protocol takes, the user will preferably define or record that protocol in the same form. For example if the enablement protocol is a sequence of touches with a particular rhythm at the top left corner of a touch screen, the user will usually define or record that protocol by actually performing the sequence of touches. Alternatively the user could define or record the protocol by other means, such as a spoken or typed description.

In a second aspect, the present disclosure provides user interface method, comprising the steps of:
i. defining an enablement protocol for a function of an electronic device, said enablement protocol comprising at least one user-defined touch on a touch-sensitive area operatively associated with said electronic device; and
ii. recording and retaining said enablement protocol of said function, such that a user enables said function by substantially reproducing said enablement protocol in the absence of spatial or temporal indication of at least a portion of said enablement protocol.

It will be appreciated that the enablement protocol which comprises a plurality of spatial and temporal data points (i.e. touches and/or gestures) may be selected from one or more of the following non-exhaustive list of spatial or temporal indications: a simple touch, movement of touch, direction of touch, timing or rhythm between touches, force of touch, number of sequential or simultaneous touches, position of touch or shape or change of shape of touch, etc.

According to a third aspect the disclosure provides a method for userdefined enablement of a function through an interface, said method comprising the steps of:
i. recording an enablement protocol comprising at least one user-defined touch of said interface;
ii. assigning said function to said enablement protocol; and
iii. executing or enabling said function when one or more touches received on or near said interface substantially coincide with the recorded enablement protocol, wherein said interface is without spatial or temporal indication of where at least a portion of said enablement protocol is to be received to execute or enable said function.

It will be appreciated that the function can be enabled by one or more touches, and that the user is required to provide the enablement protocol without spatial or temporal indication of where the enablement protocol should be received to execute or enable the function. In one aspect, the enablement protocol may comprise a plurality of user-defined touches of the interface, and at least one spatial or temporal indication of the plurality of the user-defined touches of the enablement protocol is not shown or displayed on the interface. In such embodiments, for example, the enablement protocol may comprise a swipe of a touch screen with a 1 second dwell time at the conclusion of the swipe. The screen may only show where the swipe should be received and not indicate that the user must hold their finger down at the end of the swipe for 1 second. In this case only one of the two spatial/temporal indications is shown to the user.

In another somewhat related aspect, the function may be enabled when the user input meets a predefined number of spatial or temporal indications. For example, the enablement protocol may comprise a partial swipe of a touch screen, and then a 1 second dwell time, and then a further partial swipe, i.e. swipe+dwell+swipe. The function may be enabled if only two out of these three inputs are received, e.g. swipe+dwell, or swipe+swipe, or dwell+swipe.

According to a fourth aspect the present disclosure provides a method for enablement of a function through an interface, said method comprising the steps of:
i. recording an enablement protocol substantially according to a pre-defined enablement protocol, wherein said enablement protocol includes at least one user-defined touch of said interface;
ii. assigning said function to the recorded enablement protocol; and
iii. executing or enabling said function when one or more touches received on or near said interface substantially coincide with said recorded enablement protocol, wherein said interface is without spatial or temporal indication of where at least a portion of said enablement protocol is to be received to execute or enable said function.

In this aspect, the user may be presented with a choice of suggested enablement protocols from which they can choose and substantially mimic, thereby recording their own specific and unique enablement protocol. The user can then assign a function to their unique recorded enablement protocol and execute or enable the function when they input an enablement protocol that substantially coincides with the recorded enablement protocol, wherein the interface is without spatial or temporal indication of where at least a portion of the enablement protocol is to be received to execute or enable the function.

According to a fifth aspect the present disclosure provides a method for userdefined enablement of a function through an interface, said method comprising the steps of:

i. recording an enablement protocol comprising one or more user-defined touches of said interface; and
ii. assigning said function to said enablement protocol, wherein in response to a user's request for execution or enablement of said function the user is prompted to perform said enablement protocol, wherein said function is executed or enabled when one or more touches received on or near said interface substantially coincide with the recorded enablement protocol, wherein said interface is without spatial or temporal indication of where at least a portion of said enablement protocol is to be received to execute or enable said function.

In this aspect the enablement protocol effectively acts as a 'gatekeeper' or security password control over a particular function. Essentially, the user records an enablement protocol, assigns a function to the enablement protocol and then when wishing to execute or enable the function is prompted to input their unique enablement protocol which, if coinciding with the recorded enablement protocol, allows the function to be executed or enabled.

Prior art devices typically require touches or near touches within one or more pre-existing or specified areas to enable a particular pre-defined function. For instance, a simple keypad on a touch display provides alphanumeric material at specific predefined locations, and touches or near touches at these locations must be accomplished in a specific sequence to enable the function, e.g. to activate a device containing the touch display. However, the user-defined interface method according to the present disclosure has no such spatial or temporal indication to a user of where touches or near touches should be received to enable the function, thereby allowing a user to have complete freedom in regard to defining how the functionality of an electronic device associated with the interface is enabled by touch.

To explain, a simple embodiment may involve the activation of a personal electronic device such as PDA or mobile phone. Normally a security code (optionally user-defined) is required to enable the device. This security code is normally a series of alphanumeric keystrokes either on a keypad separate from the display or on the display itself.

In one embodiment the present disclosure envisages no such spatial or temporal indication to a user. Rather a user can define a security code or 'enablement protocol' on the device or indeed on an apparatus separate from but operatively associated with the device by defining one or more touches to enable the aforementioned function. One such 'touch' may be for instance the touch of a thumb in the upper right hand corner of the screen or other touch sensitive area, or both. Alternatively, several touches at user-defined locations on the screen may enable the device. In another embodiment, a sequence of touches either at the user-defined locations or indeed anywhere on the screen can enable the functionality required. The timing or protocol (temporal sequence) of these touches must then be recreated to enable said function. In more complex arrangements both the spatial and temporal nature of the touches are examined to ensure that they meet the user-defined enablement protocol. In further arrangements, different types of touching bodies could enable different functions by performing otherwise identical enablement protocols. For example a swipe down one side of a touch screen with a stylus enables function A, while the same swipe with a finger enables function B. This embodiment expands the range of functions that can be performed with a limited range of gestures, or alternatively provides an additional security feature.

It can be seen then that any 'touch screen' input device can have a series of functions which may only be enabled by the user who defined the aforementioned 'enablement protocol', since there is no spatial or temporal indication to assist another party who may wish to enable the aforementioned functions.

In another embodiment, enablement protocols may be linked to the profiles of multiple users such that a single device may be enabled according to the profile of a user who defined a specific enablement protocol.

As an example, user A defines touches in the upper and lower left hand corners of a display to initiate a device. When touches are provided in those upper and lower corners the device is activated according to user A's profile. User B may have an entirely separate profile and may wish the device to be set up according to their specific needs. They therefore define an enablement protocol different from that of user A; not only will other parties not be able to access the device without knowing the enablement protocol of either party, but once user B initiates their particular enablement protocol the device will be activated according to their specific profile.

Indeed even if another person knew some aspects of an enablement protocol, such as the locations to be touched or the particular gesture, other aspects such as the rhythm, pattern or sequence of the touches or their touch signature e.g. finger shape, will be different and therefore they will not be able to replicate the enablement protocol.

The disclosure as described is particularly useful for users with some form of physical handicap that may prevent them from using conventional touch screen devices. By providing complete freedom to an individual user to define enablement protocols for the various functions of a device, they may define the touches in terms of spatial and temporal parameters that they can easily replicate.

Since there is no spatial or temporal indication of the enablement protocol to a user, even a simple single touch or near touch at a specific location may be sufficient as an enablement protocol with enhanced security. This is to be distinguished from known fingerprint readers, which require a direct touch within a specific area.

While enablement by a single touch or near touch is possible with the present disclosure it is generally preferred that two or more touches or near touches be used to define the enablement protocol. Touches and near touches may be detected in several ways, including a touch-down, movement of touch, direction of touch, timing or rhythm (protocol) between touches i.e. temporal sequence, force of touch, number of sequential or simultaneous touches, position of touch, and shape or change of shape of touch approaching, contacting or leaving the touch sensitive area.

One or more of these detection mechanisms may be used to complete the enablement protocol. For instance, if the touch location is correct but the shape of the touch is incorrect the protocol will not be satisfied (i.e. there is not substantial coincidence between the received and the recorded protocol) and the associated function will not be enabled. Similarly if the timing or rhythm between touches is correct but the force applied by those touches is incorrect, once again the protocol will not be satisfied. It will be appreciated that although only selected touch technologies can directly measure the force of an applied touch, certain other touch technologies, especially those with high spatial resolution, can indirectly measure touch force from deformation of the touch object.

Touches or near touches may be detected by any known touch sensing technology including analogue resistive, surface capacitive, surface acoustic wave, projected capacitive, optical and bending wave technologies, bearing in mind that some touch technologies are better suited than others for distinguishing multiple simultaneous touches, should these be part of an enablement protocol. Enablement protocols that include touch shape or change of shape will generally require high spatial resolution, such as may be offered by optical touch detection technologies disclosed in U.S. Pat. Nos. 5,914,709 and 7,352,940. However any known touch technology, including those mentioned above, can be applied with the present disclosure, with enablement protocols defined within the limitations of that technology. Certain touch technologies, e.g. resistive and bending wave, require a direct touch for activation, whereas other touch technologies, such as optical touch where a sheet of light is established in front of a display, can also sense an object hovering close to the display. The principles of the present disclosure apply whether the touch sensitive device is activated by a touch or a near touch of an interface.

In a further aspect the present disclosure provides a user interface device comprising: a touch sensitive area adapted to detect touches; a display device to display one or more functions; and a storage medium including a user-defined enablement protocol for enabling functions operatively associated with said display device, said enablement protocol including one or more user-defined touches on or near said touchsensitive area, there being no spatial or temporal indication to said user of at least a portion of said enablement protocol.

While it is preferred that the enablement protocol be performed on the display device, this is not absolutely necessary. One could envisage the enablement protocol being applied to a touch-sensitive area or 'protocol apparatus' separate from the display device. The user would simply follow the defined enablement protocol and the 'protocol apparatus' then communicates with the display device e.g. PDA or computer to enable the function held by that device. Indeed the function itself may be held by a third device, such that instigation of the enablement protocol, the display device and the various functions to be applied to the display device are all held separately.

In another aspect of the present disclosure there is provided a user-defined interface method, comprising the steps of:
i. defining for an electronic device an enablement protocol for a function of said device
whereby said enablement protocol comprises one or more user-defined touches,
ii. retaining said enablement protocol of said function, and
iii. enabling said function by said one or more user-defined touches wherein, if a user is provided with spatial or temporal indication for a portion of said enablement protocol, said enablement protocol additionally requires detection of an additional touch parameter.

Preferably the additional parameter required for the enablement protocol would include one or more of touch movement, direction of touch, timing or rhythm between touches i.e. temporal sequence, force of touch, number of sequential or simultaneous touches, shape and/or change of shape of touch including in different planes e.g. vertical and horizontal, on approach or withdrawal.

To explain, some devices may have a spatial or temporal indication for a portion of an enablement protocol. For instance, a mobile phone may have locations shown on the display that must be pressed in a certain sequence for partial enablement of the protocol. One mechanism to complete the enablement protocol could be temporal i.e. the locations must be pressed in the precise timing and sequence required. In one alternative, if spatial and temporal data are provided e.g. by flashing of the locations, the size and shape of the touch may be detected to confirm enablement by an authorised user. This detection of touch size and shape may be accomplished not only in the plane of the display or touch sensitive area but also in planes above the display e.g. the shape of the touch approaching or leaving the touch sensitive area, if the touch sensor can detect near touches. This touch signature is virtually impossible to replicate by another user and therefore provides a secure individual enablement protocol. It will be clear to a person skilled in the art that there are various other options available to confirm enablement.

Accordingly it can be seen that according to several aspects of the present disclosure there is significant flexibility and security as compared with prior art systems. Unless the context clearly requires otherwise, throughout the description and the claims, the words 'comprise', 'comprising', and the like are to be construed in an inclusive sense as opposed to an exclusive or exhaustive sense; that is to say, in the sense of 'including, but not limited to'.

The skilled person will appreciate that the term 'coincide', when used herein and when referring to a touch input being compared with a recorded or retained touch input, is meant to define that the inputs should substantially correspond. In one embodiment, as discussed above, the coincidence is substantial overlap in overall touch area, and in another embodiment may also include one or more other parameters, such as dwell time.

In a further embodiment 'coincide' may refer to a predetermined number of matches between the spatial and/or temporal data points of the touch or near touch and those of the enablement protocol.

It will be appreciated that when referring to 'touch' herein the term is also intended to encompass within its scope the term 'near touch'.

In one embodiment the touch-sensitive area is larger than the area of the display device and contains the display device within its borders. Generally, conventional touch-sensitive input devices include a display device that is at least as large as the touch-sensitive area. In one embodiment the touch-sensitive area is larger than the display itself and includes the display device within its borders. This is highly unusual but provides advantages over conventional systems, for example the opportunity of producing a smaller display with consequent power reduction. Also, by including the touch-sensitive area outside the display, the display itself is not obscured while input is applied via the touch-sensitive area. The touch portions/locations may be located on a first face of the touch-sensitive area, generally the display side, and/or a second opposite face of the touch-sensitive area. In one particular embodiment the touch portions/locations for enablement of the functions are arranged on the first and second opposite faces of the touch-sensitive area in such a way that they can be simultaneously operated by the thumb and fingers of a user.

BRIEF DESCRIPTION OF DRAWINGS

Preferred embodiments of the disclosure will now be described, by way of example only, with reference to the accompanying drawings in which.

DETAILED DESCRIPTION OF THE DISCLOSURE

Figure 1:
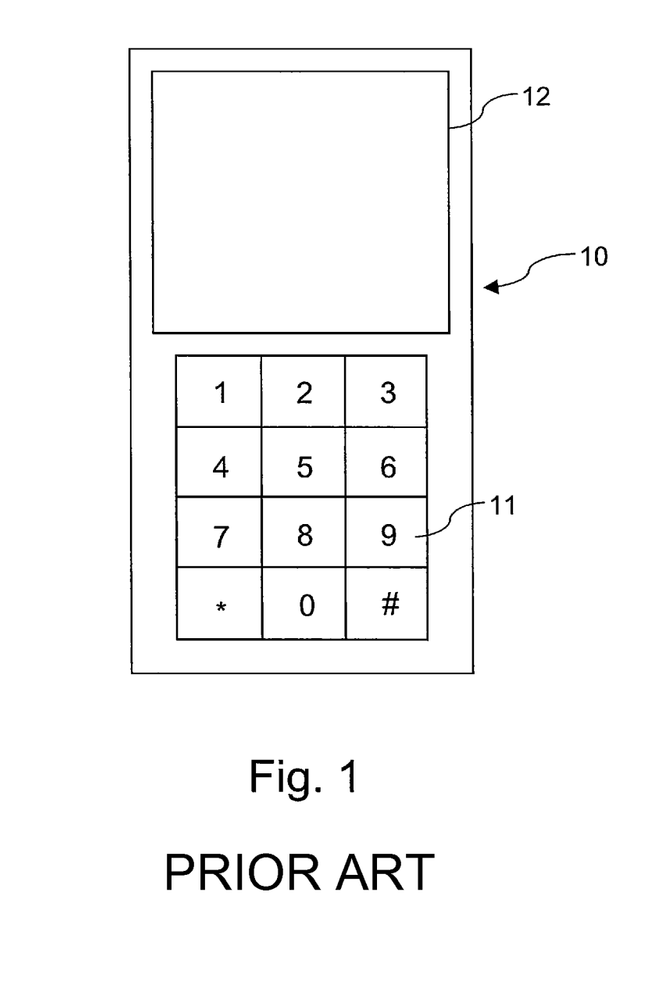
FIGS. 1 and 2 illustrate conventional user interface devices according to the prior art.
Figure 2:
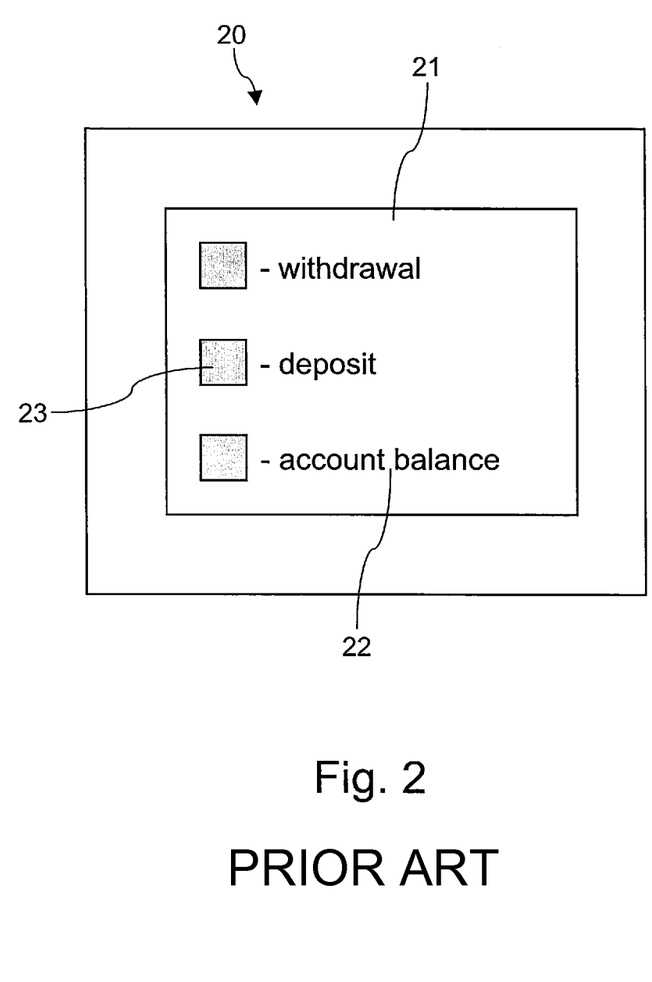

FIGS. 1 and 2 provide illustrations of prior art functionality in conventional devices.

FIG. 1 shows a mobile phone 10 with an alphanumeric keypad 11 and a display 12. In many instances the mobile phone can only be enabled when a user-defined security code is entered via the alphanumeric keypad 11. Alternatively the alphanumeric keypad may be provided on a touch-sensitive display (i.e. a touch screen) but once again the conventional device comprises a pre-defined arrangement of the enablement protocol such that if an unauthorised user were aware of the code e.g. 123, they could enable the device simply by engaging the predefined locations for numerals 1, 2 and 3.

FIG. 2 is an illustration of an automatic teller machine 20 with a touch sensitive display 21. This technology is similar to the mobile phone in FIG. 1, and in this instance various functions and spatial locations for enabling those functions are clearly defined on the display. The display includes indicia 22 describing the functions e.g. withdrawal, deposit and account balance, and the spatial locations for those functions are defined by the touch portions 23. Accordingly any user can engage the functions defined on the display 21 by simply following the spatial arrangement already predefined by the device.

The present disclosure seeks to overcome some of the difficulties associated with the prior art and provides greater flexibility and security as compared the with prior art systems. In certain embodiments the enablement protocol of the present disclosure acts to restrict the performing of a user-instigated function. That is, a user attempts to perform (whether by touch or otherwise) a function on an electronic device, and the function is only carried out if the user performs their defined enablement protocol required for that function. Generally this enablement protocol will be performed in response to an instruction, an indication or a request for user input from the electronic device, similar to a conventional 'password' dialog box. Each user of the device may have defined a single enablement protocol that enables all functions of the device, or they may have defined different enablement protocols for different functions. It will be appreciated that the particular function can be virtually anything, such as activating a device from an 'off' state or a sleep mode, logging into a computer system, or accessing a file. For example a computer system may provide different levels of access to different classes of user, with one class of users having full access to a given file, a second class of users having read-only access, and other users barred or restricted access.

In other embodiments that are applicable to functions instigated by touch input, the enablement protocol is embedded in the particular touch input, such as a gesture, that instigates the function. This instigating touch input may be predetermined by the electronic device or by software running on it (e.g. a 'double tap' gesture that opens a file), or it may be user-defined (e.g. tracing a person's initials to instigate a phone call to that person). In one example a user may attempt to open a file by double tapping on an icon, but the file will only be opened if the 'details' of the double tap gesture, such as the touch object size, the duration of each tap and the delay between the taps, substantially coincide with the pre-recorded gesture (user-defined protocol). In another example a user may assign one particular function to a swipe gesture when the gesture is performed with a finger, and a different function when the swipe is performed with a stylus.

Some specific embodiments will now be described, involving certain enablement protocols that activate an electronic device. However it will be appreciated that these particular enablement protocols could be associated with other functions of the electronic device.

Figure 3A:
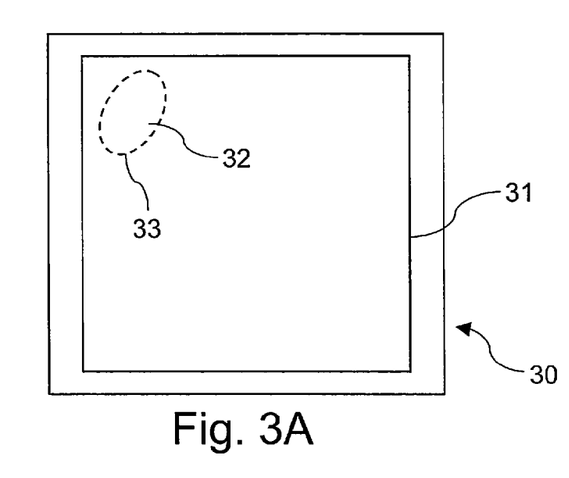
FIGS. 3A-3D illustrate a first embodiment of the present disclosure.

FIGS. 3A-3D illustrate a first embodiment according to the present disclosure. FIG. 3A shows a particular device 30 with a touch screen or touch-sensitive area 31. A user has defined the location of a touch or near touch at a location 32 in accordance with an enablement protocol for activation of the device. However, it will be clear from the foregoing description that any function of a device 30 may similarly include an enablement protocol comprising one or more user defined touches or near touches 32. Importantly, the required touch location 32, i.e. the enablement protocol, is not shown on the device at all. The dotted line 33 indicates the location for illustrative purposes only, and there is no spatial or temporal indication whatsoever on the device 30 of where or how the touches should be applied to satisfy the user-defined enablement protocol. In fact there may be no display associated with the touch-sensitive area.

This is clearly a significant advantage over the prior art since it will be virtually impossible for an unauthorised user to determine the enablement protocol without any form of spatial or temporal indication.

Figure 3B:
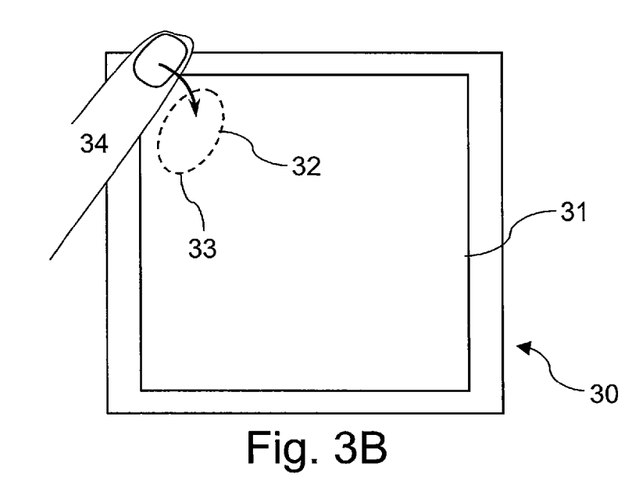
Figure 3C:
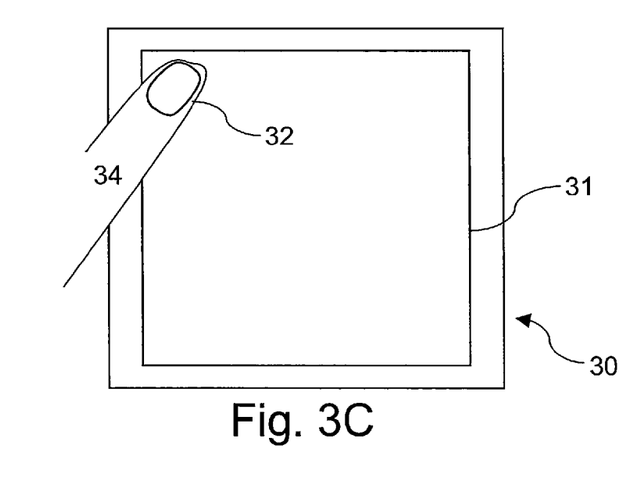
Figure 3D:
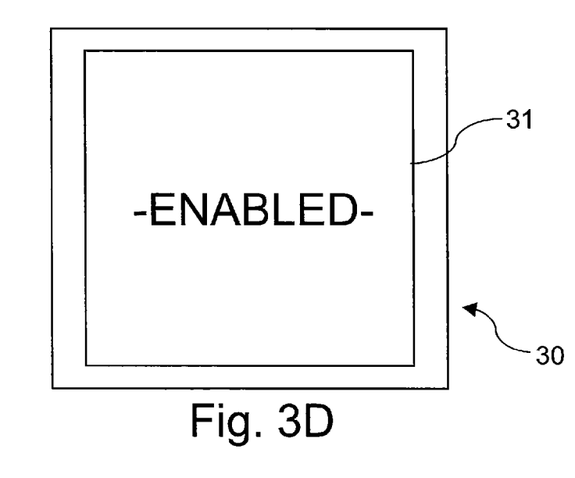

In FIG. 3B a user commences application of the enablement protocol, which requires a thumb to be placed at the location 32. In FIG. 3C it can be seen that the user places their thumb 34 at the required location 32, thereby satisfying the enablement protocol that results in activation of the device.

In the embodiment shown in FIGS. 3A-3D the enablement protocol comprises a single touch at the user-defined location 32 on the touch-sensitive area 31 of the particular device 30. It will be clear, however, that the enablement protocol may comprise other forms of touch.

Figure 4A:
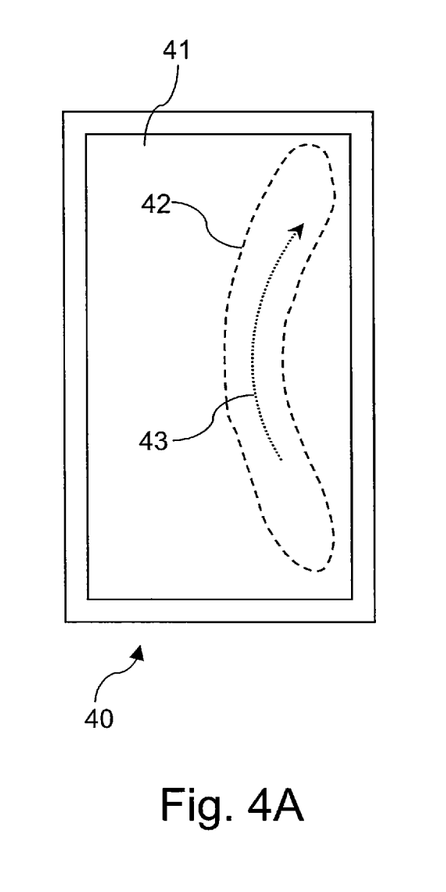
FIGS. 4A-4C illustrate a second embodiment of the present disclosure.
Figure 4B:
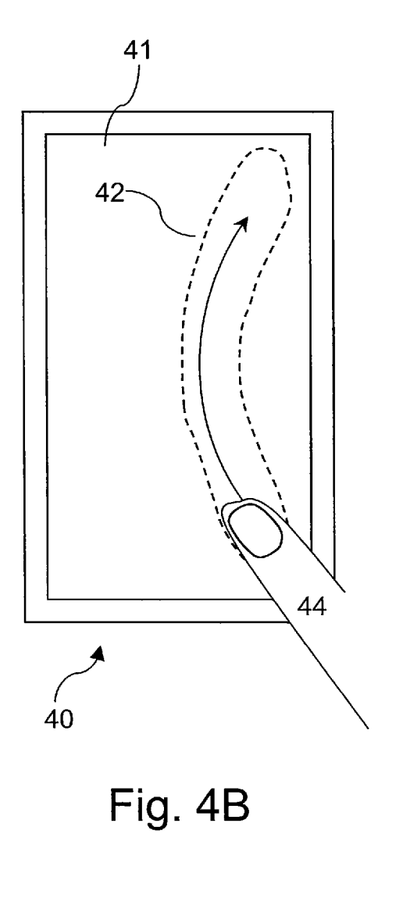
Figure 4C:
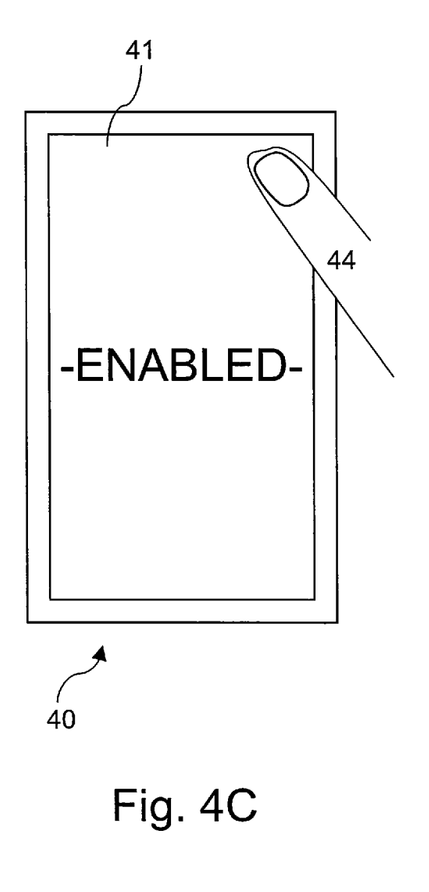

For instance, the embodiment shown in FIGS. 4A-4C displays a swipe by the user of their thumb to satisfy the enablement protocol. This embodiment again comprises a device 40 with a touch-sensitive area 41. The spatial location of the enablement protocol for a certain function is shown by dotted lines 42 again for illustrative purposes only. In this instance, the enablement protocol requires movement of the thumb along the arc 43. The enablement protocol may also include the timing or speed of the swipe from the lower right hand corner to the upper right hand corner, the contact dwell time at the start or end of the swipe, and the shape of the thumb on the surface of the touch-sensitive area. It will be appreciated that this offers an enhanced degree of security in that even if another person knew the correct gesture, say by observation, it would be extremely difficult for them to replicate all other aspects of the enablement protocol.

Figure 5A:
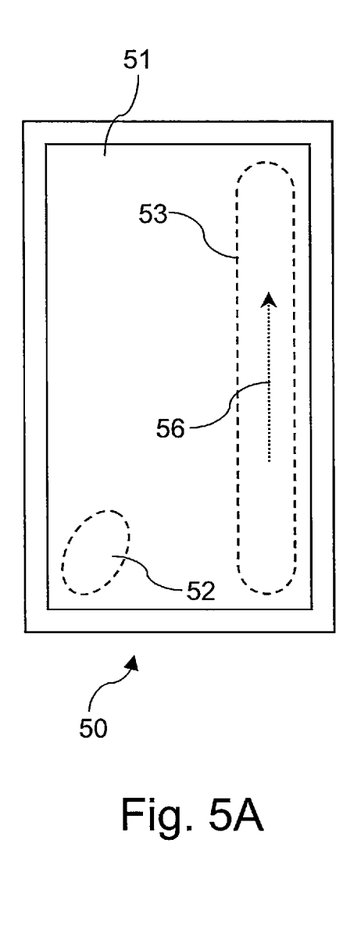
FIGS. 5A-5C illustrate a third embodiment of the present disclosure.
Figure 5B:
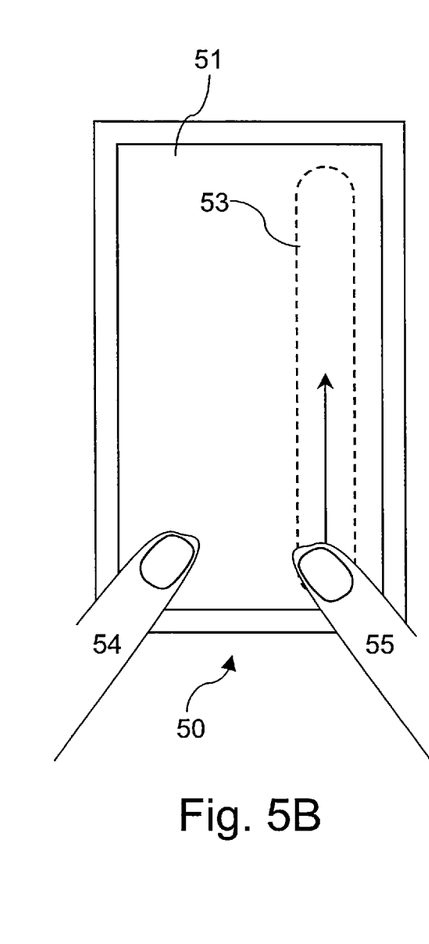
Figure 5C:
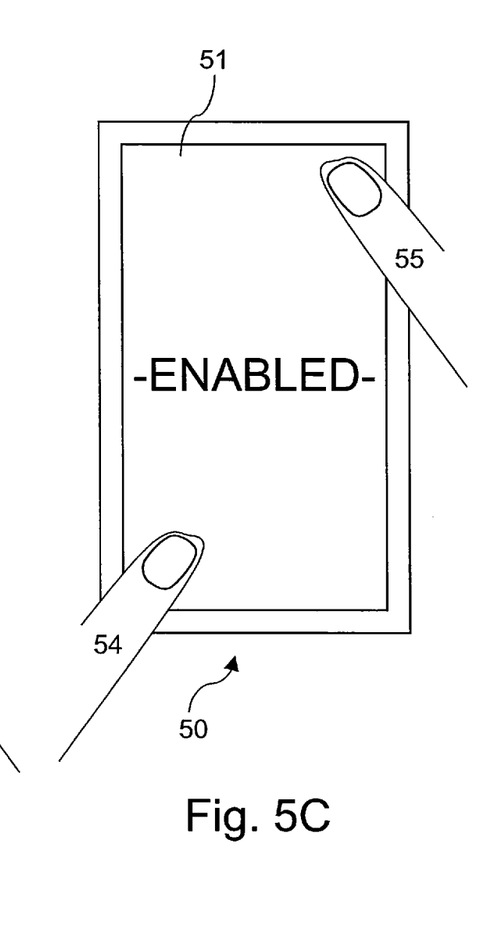

As shown in FIG. 4B the user holds the device, swipes their thumb 44 across the area 42 in the predefined fashion required by the enablement protocol i.e. speed, timing, area covered etc such that, as shown in FIG. 4C, the device is activated. In FIGS. 5A-5C a multiple touch enablement protocol is shown. In this embodiment a device 50 with a touch sensitive area 51 requires two touches at specific spatial locations to activate the device. The spatial location 52 requires a touch of a left thumb 54, and the spatial location 53 requires a swipe of a right thumb 55 along a linear path 56. Once again, similar to FIGS. 3A-3D and FIGS. 4A-4C, there is no outward indication either spatially or temporally of the enablement protocol. The screen may be completely blank and the enablement protocol is known only to the authorised user of the device 50.

Once the touch at the location 52 and the swipe at the location 53 are accomplished in line with the protocol, the device 50 is activated. In an alternative embodiment that provides an additional security measure, the screen may display indicia suggesting where touch input is required to enable a protocol, however the indicia may be specifically configured to falsely indicate where the actual input is required to enable the function, thereby intentionally frustrating the attempts of an unauthorised person to access the electronic device.

FIGS. 6A-6D and 7A-7D illustrate how a touch is detected and how a characteristic touch signature of an individual may be determined.

Figure 6A:
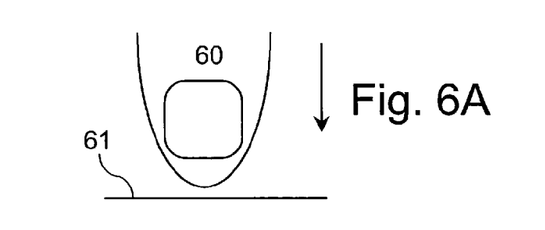
FIGS. 6 and 7 illustrate touch signature recognition according to a fourth embodiment of the present disclosure.
Figure 6B:
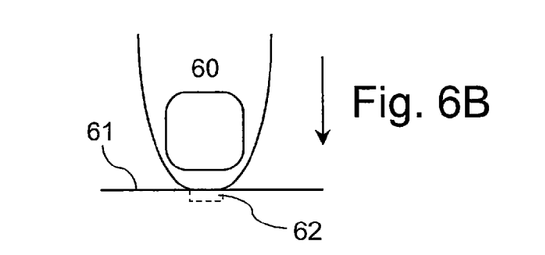
Figure 6C:
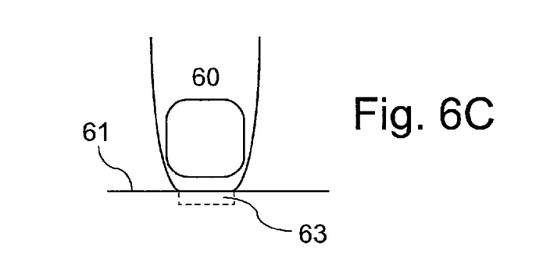
Figure 6D:
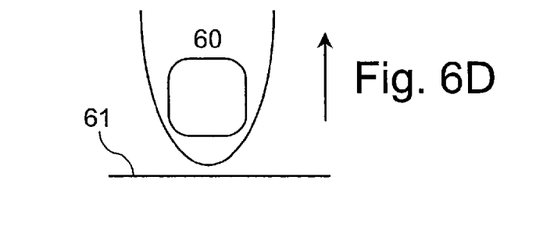
Figure 7A:
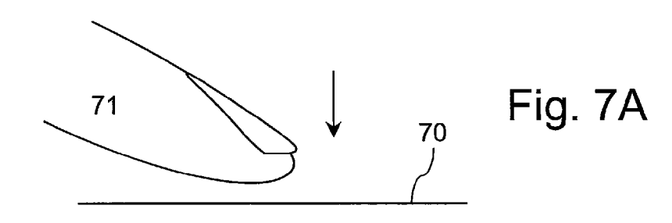
Figure 7B:
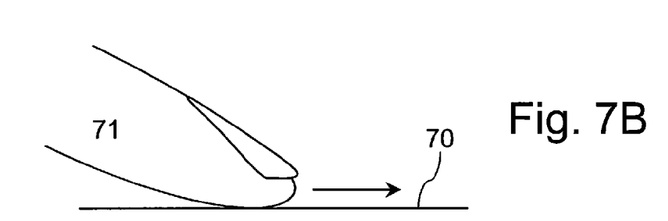
Figure 7C:
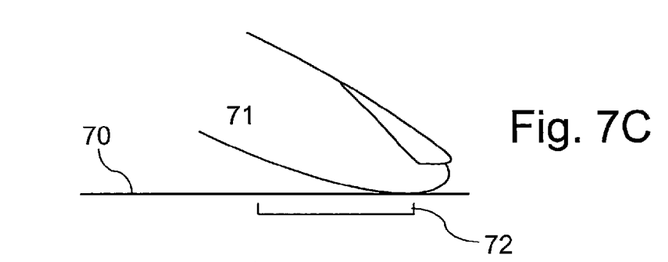
Figure 7D:
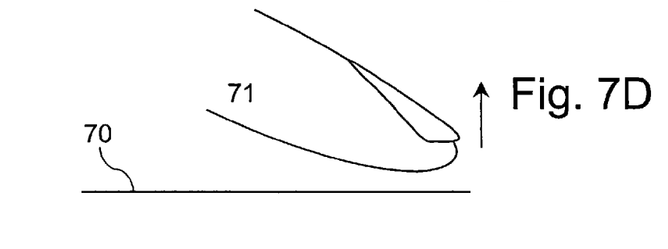

In FIG. 6A a finger 60 is approaching the surface 61 of a touch screen. In FIG. 6B the finger first comes into contact with the surface and is therefore detected. At this point it can be seen that the area 62 of the surface covered by the finger is relatively small. As the user proceeds with the touch, greater pressure is applied to the surface thereby distorting the finger such that it covers a greater area 63 of the surface, as seen in FIG. 6C. In 6D the finger is withdrawn after a certain time that may itself be part of an enablement protocol.

If the resolution and sensitivity of the touch detection apparatus is sufficient, this change of shape of a finger as it approaches, touches and withdraws from the surface 61 can be detected and may form part of an enablement protocol. This is particularly useful since even if the precise spatial and temporal location of an enablement protocol is known by an unauthorised user, the protocol may only be satisfied if the specific shape and change of shape of the touch matches that of the authorised user.

FIG. 7 gives a further illustration. FIGS. 7A-7D show a finger movement or swipe on a touch-sensitive surface 70. In FIG. 7A a finger 71 approaches the surface 70, and in FIG. 7B the finger first contacts the surface. The finger then slides across the surface to the point shown in FIG. 7C and is then removed as shown in FIG. 7D. The distance 72 covered by the finger may be detected and form part of an enablement protocol. Similarly, the change in shape of the finger as it slides may also be detected. Accordingly it can be seen that virtually any movement, shape or change of shape of a touch object can be detected and form part of an enablement protocol for enabling a particular function on a device. Unless an unauthorised user can match with sufficient precision the touch signature of the user who defined the enablement protocol, it is virtually impossible for an unauthorised user to match the enablement protocol and thereby enable the functions of the particular device. Clearly touching with an implement such as a pen will not satisfy an enablement protocol defined by a finger or thumb.

FIGS. 8A-8C and 9A-9C disclose a further embodiment of the present disclosure displaying the powerful flexibility and security available with user-defined enablement protocols.

Figure 8A:
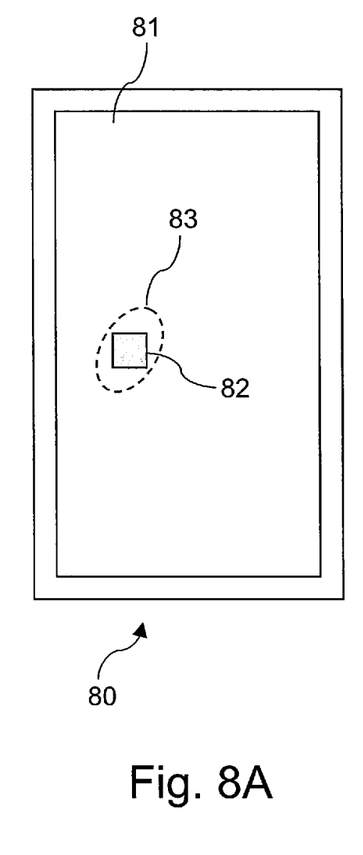
FIG. 8A-8C illustrate a fifth embodiment of the present disclosure.
Figure 8B:
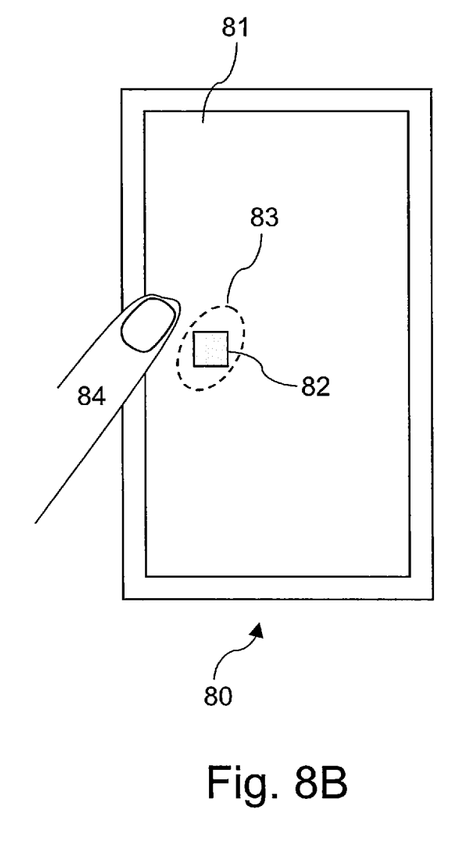
Figure 8C:
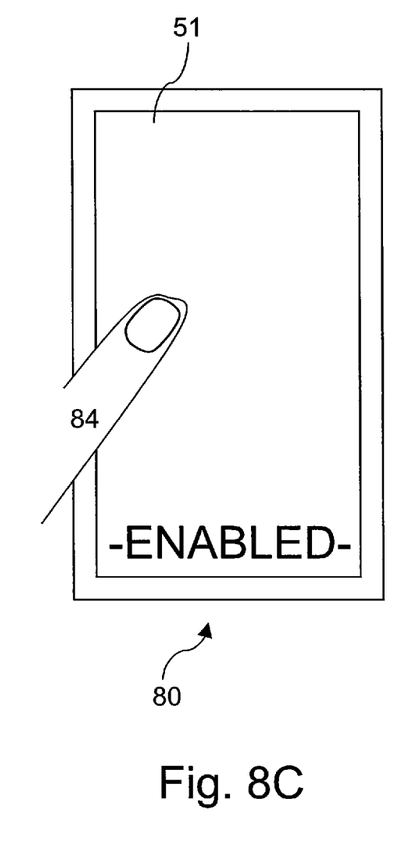

In FIGS. 8A-8C it can be seen that even if spatial or temporal indicators are provided on the device, an enablement protocol will still not be satisfied if it includes detection of additional touch or near touch parameters, e.g. shape or change of shape of a touch object.

In FIG. 8A a device 80 with a touch sensitive display 81 shows a spatial indicator 82 forming part of an enablement protocol. In other words, the enablement protocol for a specific function of this device requires a single touch at the location of the indicator 82. However in this embodiment the shape 83 of the touch object, of which there is no indication given on the display, also forms part of the enablement protocol as discussed above in relation to FIGS. 6A-6D. With certain touch detection systems e.g. optical systems, the resolution is sufficiently high to measure shape and/or change of shape on approach, at touch-down and at withdrawal of touch. In FIG. 8B a user holds the device 80 and commences the enablement protocol by placing the pad of their thumb 84 on the indicator 82. This is accomplished in FIG. 8C and the function is enabled. Importantly, even though the spatial indicator 82 gives a user some indication of the required enablement protocol, if a touch object does not match the required shape 83, the device will not be enabled. For example touching the indicator 82 with a stylus or fingertip will not satisfy the enablement protocol.

Figure 9A:
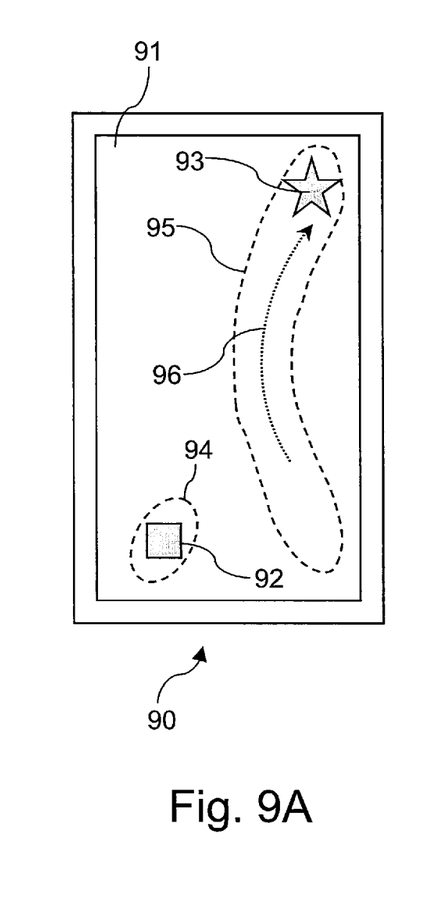
FIGS. 9A-9C illustrate a sixth embodiment of the present disclosure.
Figure 9B:
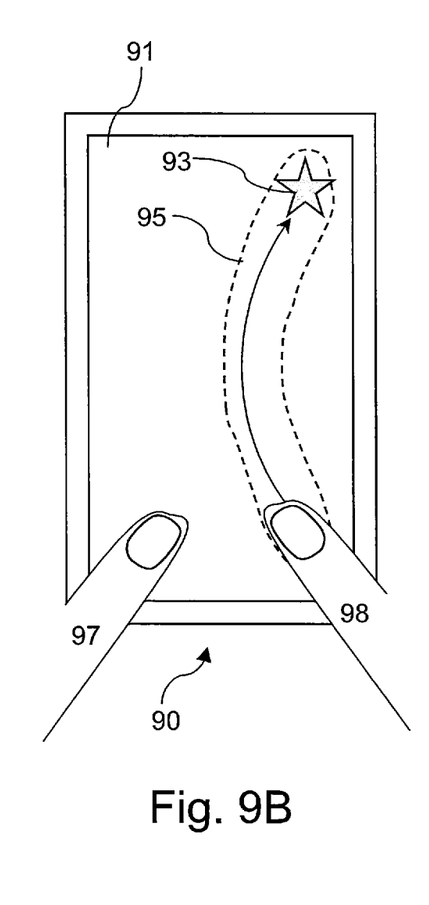
Figure 9C:
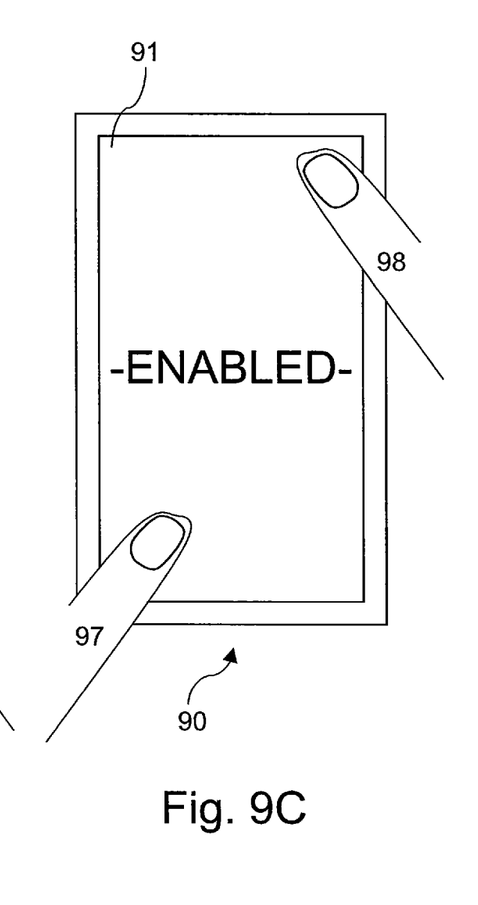

A further embodiment can be seen in FIGS. 9A-9C. In this embodiment a device 90 includes a touch sensitive display 91 showing two spatial and/or temporal indicators 92 and 93. In this instance one or both of the indicators 92 and 93 may be flashing to indicate the desired temporal sequence between touches at the indicators 92 and 93. However, as indicated by the dotted lines 94 and 95 (illustrative only, not shown on the display) the enablement protocol requires a simple touch at the location of the indicator 92, but not at the location of the indicator 93. Rather, the protocol requires a swipe along an arc 96 that begins in the lower right hand corner and terminates at the indicator 93. Accordingly, for an authorised user to enable a specific function, the device is held such that that portion of the enablement protocol requiring a left thumb touch 97 at the location of the indicator 92 is satisfied, and the right thumb 98 proceeds from the lower right hand corner up to the location of the indicator 93 within the time specified by the enablement protocol. When both the spatial and temporal sequence as well as shape, change of shape or any other touch or near touch parameters are satisfied, the enablement protocol enables the function of the device 90 and the device is, in this embodiment, activated. There is virtually no prospect, even when the spatial and temporal indicators are provided, that an unauthorised user could satisfy all aspects of the user-defined protocol.

In another embodiment, an unauthorised person attempting to access the electronic device could attempt to replicate the enablement protocol of an authorised person by carefully inspecting the touch surface for residual finger marks. In cases such as these the enablement protocol may be selected to avoid indicating, from an inspection of finger marks alone, the actual enablement protocol. For example, a circular enablement protocol would not indicate the direction which the user traced out the circle. Similarly, the direction of a swipe would be difficult to interpret from only residual finger marks, and enablement protocols with temporal features such as the rhythm of a touch sequence could not be ascertained from residual finger marks.

It will be clear to persons skilled in the art that the proposed method and device has significant flexibility and security as compared with the prior art. In addition, since all functions of a device may be linked to user-defined enablement protocols, operation of the device is completely user-dependent. This is also particularly helpful for users of such interface devices who cannot use conventional touch techniques, e.g. handicapped persons.

Although the disclosure has been described with reference to specific embodiments, it will be appreciated by those skilled in the art that the disclosure may be embodied in many other forms.

The invention claimed is:

1. A user interface method, comprising:
defining a plurality of different enablement protocols for a function of an electronic device corresponding to a plurality of different users, said enablement protocols each comprising at least one user-defined gesture for touch input on a touch-sensitive area of a display screen operatively associated with said electronic device by displaying at least two visual indicators indicative of each of the different enablement protocols which each include a continuous touch including a point on the touch-sensitive area other than the at least two visual indicators and which terminates at one of the at least two visual indicators on the touch-sensitive area of the display screen and inputting the at least one user-defined gesture on the touch-sensitive area of the display screen for each of the enablement protocols;
retaining said enablement protocols of said function; and
displaying the at least two visual indicators on the touch-sensitive area of the display screen and receiving a gesture for touch input on the touch sensitive area of the display screen that substantially reproduces the at least one input user-defined gesture that includes the continuous touch including the point on the touch-sensitive area other than the at least two visual indicators and which terminates at the one of the at least two visual indicators corresponding to one of the users to enable said function for the one of the users,
wherein the different enablement protocols are uniquely associated with different user-defined gestures.

2. A user interface method according to claim 1, wherein the point on the touch-sensitive area other than the at least two visual indicators is different for each of the different enablement protocols.

3. A user interface method according to claim 1, wherein the point on the touch-sensitive area other than both of the first and second visual indicators is different for each of the different enablement protocols.

4. A method for user-defined enablement of a function through a touch sensitive area of a display interface, said method comprising the steps of:
first and second visual indicators on the touch-sensitive area and inputting a plurality of different enablement protocols corresponding to a plurality of different users, where each of the enablement protocols includes a user-defined gesture on the touch-sensitive area of the display interface, where each of the plurality of different enablement protocols includes a continuous touch including a point on the touch-sensitive area other than both of the first and second visual indicators and which terminates at one of the first and second visual indicators;
recording the plurality of different enablement protocols;
assigning said function to said enablement protocols; and
displaying the at least two visual indicators and receiving a gesture for touch input on the touch sensitive area of the display interface that substantially reproduces one of the enablement protocols corresponding to one of the users that includes the continuous touch including the point on the touch-sensitive area other than both of the first and second visual indicators and which terminates at the one of the first and second visual indicators to enable said function for the one of the users,
wherein the different enablement protocols are uniquely associated with different user-defined gestures.

5. A method for enablement of a function through a touch sensitive area of an interface, said method comprising the steps of:
first and second visual indicators and inputting a plurality of different enablement protocols corresponding to a plurality of different users, where each of the enablement protocols is a user-defined gesture that includes a continuous touch on the touch-sensitive area including touching the first visual indicator, touching a location other than the first and second visual indicators, and terminating at the second visual indicator;

recording the enablement protocols;

assigning said function to the recorded enablement protocols corresponding to the different users; and displaying the at least two visual indicators and receiving a gesture for touch input on the touch sensitive area of the interface that substantially reproduces one of the enablement protocols corresponding to one of the users that includes the continuous touch on the touch-sensitive area including touching the first visual indicator, touching the location other than the first and second visual indicators, and terminating at the second visual indicator to enable said function for the one of the users, wherein the different enablement protocols are uniquely associated with different user-defined gestures.

6. A method for user-defined enablement of a function through a touch sensitive area of an interface, said method comprising the steps of:

visual indicators and inputting a plurality of different enablement protocols corresponding to a plurality of different users, where each of the enablement protocols is a user-defined touch on the touch-sensitive area of the interface that includes a continuous touch including a location on the touch-sensitive area other than the at least two visual indicators and which terminates at one of the at least two visual indicators;

recording the enablement protocols;

displaying the at least two visual indicators and receiving a continuous touch for touch input on the touch sensitive area of said interface that substantially reproduces the user-defined touch of one of the enablement protocols corresponding to one of the users in response to a request for enablement of said function when prompted to perform said one of the enablement protocols; and enabling said function for the one of the users when the received continuous touch substantially coincides with the recorded one of the enablement protocols corresponding to the one of the users, wherein the different enablement protocols are uniquely associated with different user-defined gestures.

7. A user interface method according to claim 6, wherein said enablement protocols comprise one or more of a simple touch, movement of touch, direction of touch, timing or rhythm between touches, force of touch, number of sequential or simultaneous touches, position of touch or shape or change of shape of touch.

8. A method according to claim 6, wherein said function is enabled for the one of the users when the received continuous touch meets a predefined number of spatial or temporal indications of said recorded one of the enablement protocols corresponding to the one of the users.

9. A user interface device, comprising:

a touch sensitive area which displays at least two visual indicators to enable a function;

a storage medium including a plurality of different user-defined enablement protocols corresponding to a plurality of different users and for enabling the function, where each of said enablement protocols comprises at least one input user-defined gesture received on or near said touch-sensitive area that includes a continuous touch including the point on the touch-sensitive area other than the at least two visual indicators and which terminates at the one of the at least two visual indicators, wherein the touch sensitive area receives a gesture that includes a continuous touch including the point on the touch-sensitive area other than the at least two visual indicators and which terminates at the one of the at least two visual indicators and that substantially reproduces the user-defined gesture of one of the enablement protocols corresponding to one of the users to enable the function, and wherein the different enablement protocols are uniquely associated with different user-defined gestures.

10. A user-defined interface method for a touch-sensitive area of a display screen, comprising the steps of:

visual indicators and inputting a plurality of different enablement protocols, where each of the enablement protocols includes at least one user-defined gesture on the touch-sensitive area of the display interface that includes a continuous touch including a location on the touch-sensitive area other than the at least two visual indicators and which terminates at one of the at least two visual indicators;

defining the enablement protocols for a function of an electronic device retaining said enablement protocols of said function corresponding to a plurality of different users;

displaying the at least two visual indicators and receiving at least one gesture on or near the touch sensitive area of the display screen that substantially reproduces one of the enablement protocols corresponding to one of the users to enable said function for the one of the users; and enabling said function for the one of the users upon detection of an additional touch parameter in said received at least one gesture, wherein the different enablement protocols are uniquely associated with different user-defined gestures.

11. A user interface method according to claim 10, wherein said additional touch parameter includes one or more of touch movement, direction of touch, timing or rhythm between touches, force of touch, number of sequential or simultaneous touches, and shape or change of shape of touch.

12. A user interface method according to claim 11, wherein said additional touch parameter includes the change of shape of a touch in the vertical and/or horizontal planes on approach or withdrawal of said touch.

\* \* \* \* \*